(12) United States Patent
Mitsuhashi et al.

(10) Patent No.: US 8,931,850 B2
(45) Date of Patent: Jan. 13, 2015

(54) SEAT BACK FRAME

(71) Applicants: Toyota Boshoku Kabushiki Kaisha, Aichi-ken (JP); NHK Spring Co., Ltd., Kanagawa (JP)

(72) Inventors: Atsutaka Mitsuhashi, Miyoshi (JP); Ryoshu Nakane, Toyota (JP); Koji Murayama, Yokohama (JP)

(73) Assignees: Toyota Boshoku Kabushiki Kaisha, Aichi-Ken (JP); NHK Spring Co., Ltd, Kanagawa (JP)

( * ) Notice: Subject to any disclaimer, the term of this patent is extended or adjusted under 35 U.S.C. 154(b) by 66 days.

(21) Appl. No.: 13/650,217

(22) Filed: Oct. 12, 2012

(65) Prior Publication Data

US 2013/0093226 A1  Apr. 18, 2013

(30) Foreign Application Priority Data

Oct. 14, 2011  (JP) ................. 2011-226738

(51) Int. Cl.
*A47C 7/02* (2006.01)
*B60N 2/68* (2006.01)
*B60N 2/22* (2006.01)
*B60N 2/30* (2006.01)

(52) U.S. Cl.
CPC  *B60N 2/68* (2013.01); *B60N 2/682* (2013.01); *B60N 2/22* (2013.01); *B60N 2/3013* (2013.01)
USPC .................. 297/452.2; 297/452.18

(58) Field of Classification Search
USPC ............. 297/452.18, 232, 452.2, 440.14, 297/440.15, 440.2, 440.24
See application file for complete search history.

(56) References Cited

U.S. PATENT DOCUMENTS

| | | | | |
|---|---|---|---|---|
| 3,081,131 | A * | 3/1963 | Brueder | 297/452.2 |
| 3,759,572 | A * | 9/1973 | Koepke | 297/452.4 |
| 5,464,273 | A * | 11/1995 | Makoto | 297/232 |
| 5,498,096 | A * | 3/1996 | Johnson | 403/267 |
| 5,624,160 | A * | 4/1997 | Koch et al. | 297/452.2 |
| 6,352,311 | B1 * | 3/2002 | Hayotte | 297/452.2 |
| 6,742,847 | B2 * | 6/2004 | Yanai | 297/452.2 |
| 6,802,124 | B2 * | 10/2004 | Kinzer et al. | 29/897.2 |
| 7,029,067 | B2 * | 4/2006 | Vits et al. | 297/238 |
| 8,132,862 | B2 * | 3/2012 | Yamada et al. | 297/452.2 |

(Continued)

FOREIGN PATENT DOCUMENTS

| | | |
|---|---|---|
| CN | 102205807 | 10/2011 |
| DE | 1529471 | 12/1969 |

(Continued)

OTHER PUBLICATIONS

German Office Action dated Dec. 11, 2013, along with English-language translation thereof.
Chinese Office Action dated Nov. 3, 2014, along with English-language translation thereof.

*Primary Examiner* — Ryan Kwiecinski
(74) *Attorney, Agent, or Firm* — Greenblum & Bernstein, P.L.C.

(57) ABSTRACT

A seat back frame includes a main frame that forms a frame of a seat back of a main seat, and an auxiliary frame that forms a frame of a seat back of an auxiliary seat adjacent to the main seat in a width direction, and that is integrally formed with the main frame. The main frame has a first open portion that opens toward a side with the auxiliary seat in the width direction. An end portion of the auxiliary frame is a fitting structure that fits together with the first open portion, and a portion of the fitting structure is welded.

3 Claims, 7 Drawing Sheets

(56) References Cited

U.S. PATENT DOCUMENTS

2003/0141752 A1* 7/2003 Igarashi ................ 297/452.18
2010/0187893 A1* 7/2010 Yamada et al. .......... 297/452.18
2013/0307310 A1* 11/2013 Saada et al. ............. 297/452.2
2013/0341991 A1* 12/2013 Matsuzaki .............. 297/452.18

FOREIGN PATENT DOCUMENTS

| | | |
|---|---|---|
| DE | 10311869 | 9/2004 |
| DE | 102005020671 | 3/2006 |
| JP | 2000-262348 | 9/2000 |
| JP | 2008-194289 | 8/2008 |

* cited by examiner

SEAT BACK FRAME

INCORPORATION BY REFERENCE

The disclosure of Japanese Patent Application No. 2011-226738 filed on Oct. 14, 2011 including the specification, drawings and abstract is incorporated herein by reference in its entirety.

BACKGROUND OF THE INVENTION

1. Field of the Invention

The invention relates to a seat back frame.

2. Description of Related Art

Figure 7:
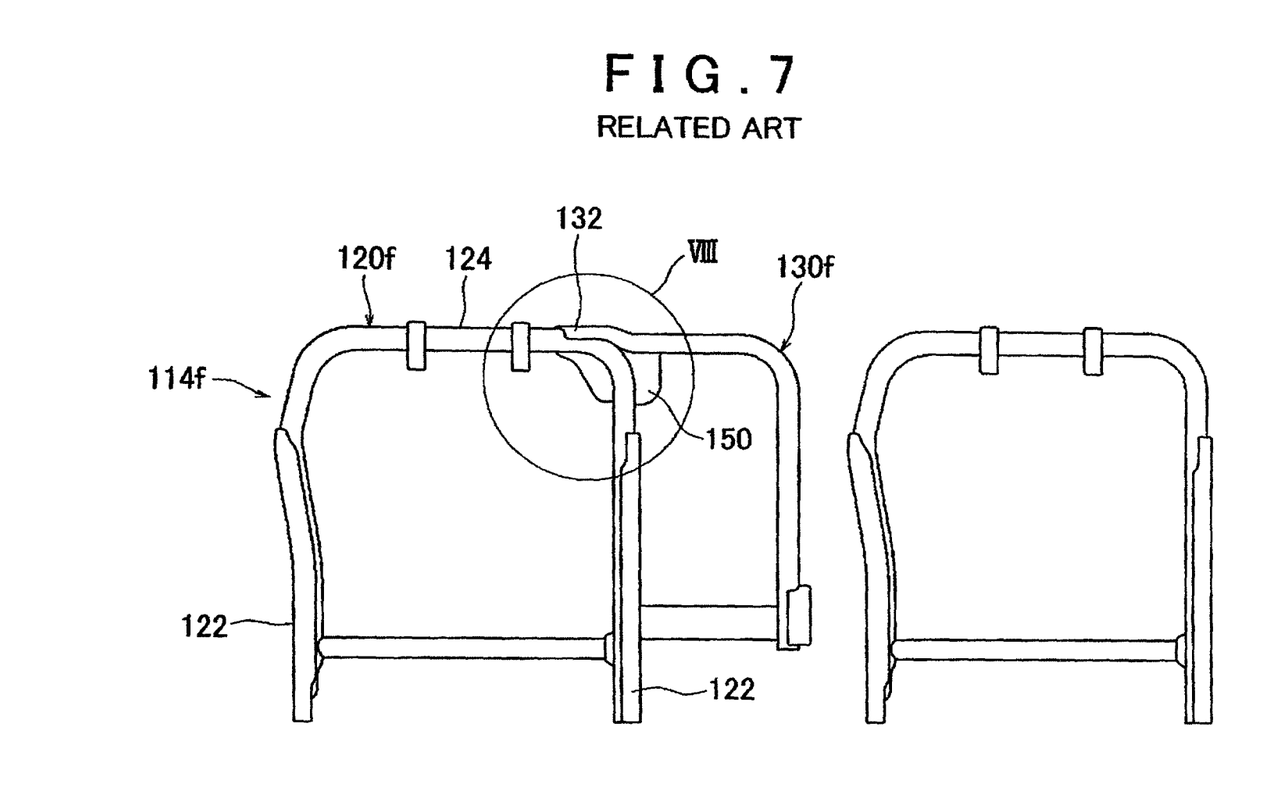
FIG. 7 is a front view of a seat back frame according to related art.
Figure 8A:
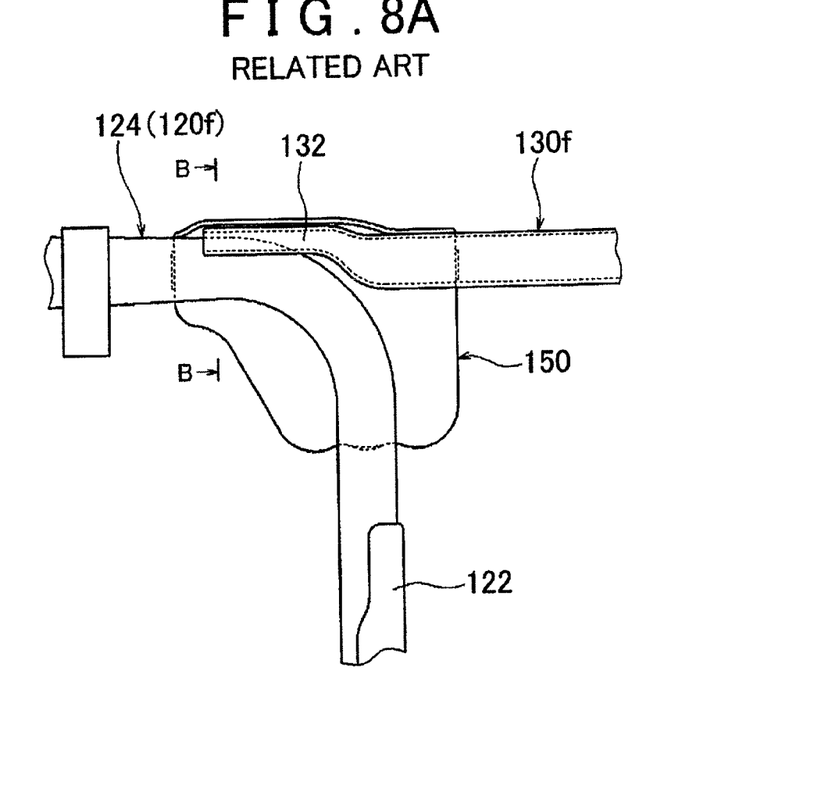
FIG. 8A is a partial enlarged view of a connecting structure of a main frame and an auxiliary frame of the seat back frame according to the related art.
Figure 8B:
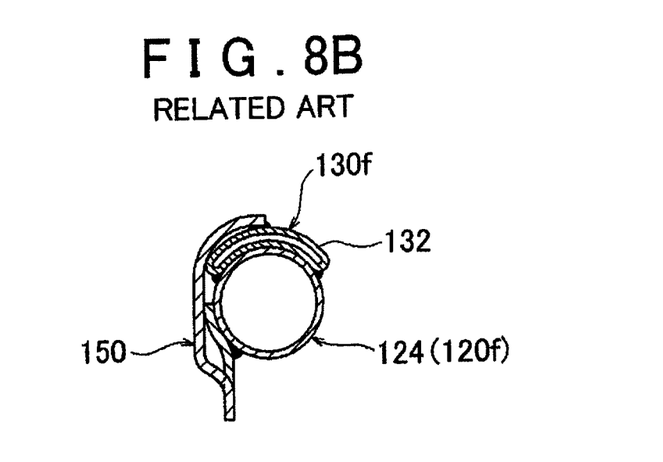
FIG. 8B is a sectional view taken along line B-B in FIG. 8A.

Japanese Patent Application Publication No. 2008-194289 (JP 2008-194289 A), for example, describes a seat back frame in which a main frame that forms a frame of a seat back of a main seat is integrally formed with an auxiliary frame that forms a frame of a seat back of an auxiliary seat adjacent to the main seat in a width direction. As shown in FIGS. 7, 8A, and 8B, a main frame 120f of a seat back frame 114f in JP 2008-194289 A has a side frame 122 formed on both sides, and an upper frame 124 that connects upper portions of the side frames 122 together. Also, an auxiliary frame 130f is formed by a generally L-shaped tube-shaped member being connected to the main frame 120f, in a position adjacent to the main frame 120f in the width direction. Here, the auxiliary frame 130f has a frame body in which hollow steel pipe has been bent in a generally inverted L-shape. The auxiliary frame 130f has a flat end portion 132 that has been press-formed into a generally flat shape. The flat end portion 132 is welded to a shoulder portion of the upper frame 124 of the main frame 120f. Also, because the end portion (i.e., the flat end portion 132) of the auxiliary frame 130f is press-formed into a flat shape, an auxiliary plate 150 is welded to the flat end portion 132 in order to ensure rigidity of the connecting portion.

However, with the seat back frame 114f described in JP 2008-194289 A, there is room for improvement because the auxiliary plate 150 must be provided on the connecting portion where the auxiliary frame 130f is connected to the main frame 120f, which increases the number of parts. Also, the end portion of the auxiliary frame 130f must be press-formed into the flat end portion 132, so the manufacturing cost may also increase.

SUMMARY OF THE INVENTION

The invention thus provides a seat back frame in which a main frame that forms a frame of a seat back of a main seat is integrally formed with an auxiliary frame that forms a frame of a seat back of an auxiliary seat adjacent to the main seat in a width direction, without leading to an increase in the number of parts.

A first aspect of the invention relates to a seat back frame that includes a main frame that forms a frame of a seat back of a main seat, and an auxiliary frame that forms a frame of a seat back of an auxiliary seat adjacent to the main seat in a width direction, and that is integrally formed with the main frame. At least a portion of the main frame is formed by a first tube-shaped member. The first tube-shaped member has a first open portion that opens toward a side with the auxiliary seat in the width direction. At least a portion of the auxiliary frame is formed by a second tube-shaped member. An end portion of the second tube-shaped member is a fitting structure that fits together with the first open portion of the first tube-shaped member. A portion of the fitting structure is welded such that the main frame and the auxiliary frame are integrally formed.

According to this aspect, the first tube-shaped member of the main frame has the first open portion that opens toward the side with the auxiliary seat in the width direction. Also, the end portion of the second tube-shaped member of the auxiliary frame is a fitting structure that fits together with the first open portion of the first tube-shaped member, and is welded such that the main frame and the auxiliary frame are integrally formed. As a result, press-forming to make the end portion of the auxiliary frame into a flat end portion is not necessary as it is in the related art, so the manufacturing cost is able to be suppressed. Also, with the structure in which the end portion of the auxiliary frame is made into the flat end portion of the related art, stress with respect to a load on the seat back concentrates at the flat end portion. The structure described above is not a structure of a flat end portion, but rather a structure of a tube-shaped member, and thus is a structure in which stress does not tend to concentrate. Also, there is no need to provide a reinforcing plate, so the number of parts can be inhibited from increasing. Accordingly, it is possible to provide a seat back frame in which a main frame that forms a frame of a seat back of a main seat is integrally formed with an auxiliary frame that forms a frame of a seat back of an auxiliary seat adjacent to the main seat in a width direction, without leading to an increase in the number of parts.

In the aspect described above, the main frame may have a side frame formed on both sides, and an upper frame that connects upper portions of the side frames together. Also, a reinforcing rod that connects the side frames together may be provided at a lower portion of the side frames. Further, the reinforcing rod may pass through the side frame that is arranged on a side with the auxiliary frame and extend to a position abutting against the auxiliary frame, and an abutting portion of the reinforcing rod and the auxiliary frame may be welded.

According to this structure, the reinforcing rod that connects the side frames is provided at a lower portion of the side frames. This reinforcing rod passes through the side frame that is arranged on the side with the auxiliary frame, from among the two side frames, and extends to a position where it abuts against the auxiliary frame, and the abutting portion of the reinforcing rod and the auxiliary frame is welded. Therefore, the main frame and the auxiliary frame both share the reinforcing rod, so the number of parts is able to be further inhibited from increasing. Also, a moment load following rotation of the seat back is applied to the lower portion of the seat back, so stress tends to concentrate there (i.e., at the lower portion of the seat back). In particular, with the related structure in which both the main frame and the auxiliary frame have a reinforcing rod, these reinforcing rods are both welded, so stress of the moment load tends to concentrate at these welds. Here, by having the reinforcing rod be shared and pass through the side frame arranged on the auxiliary frame side, the portion that is welded can be reduced, thus suppressing the stress concentration of the moment load. Also, a thick member may easily be applied to the reinforcing rod while minimizing the number of parts. Applying a thick member to the reinforcing rod in this way enables the rigidity of both the main frame and the auxiliary frame to be increased. As a result, the rigidity of the entire seat back is able to be increased.

Further, in the aspect described above, a weld of the end portion of the second tube-shaped member and the first open portion of the first tube-shaped member may be provided on the upper frame.

According to this structure, the lower portion of the seat back is a portion where moment load following rotation of the seat back is applied and is thus a portion where stress tends to concentrate. Therefore, by having the portion where the weld of the end portion of the second tube-shaped member and the first open portion of the first tube-shaped member is provided be the upper frame of the main frame that is positioned at an upper portion of the seat back, the number of parts is able to be minimized while inhibiting stress concentration.

According to the structure described above, the invention is able to provide a seat back frame in which a main frame that forms a frame of a seat back of a main seat is integrally formed with an auxiliary frame that forms a frame of a seat back of an auxiliary seat adjacent to the main seat in a width direction, without leading to an increase in the number of parts.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, example embodiments of the invention will be described with reference to the accompanying drawings.

Figure 1:
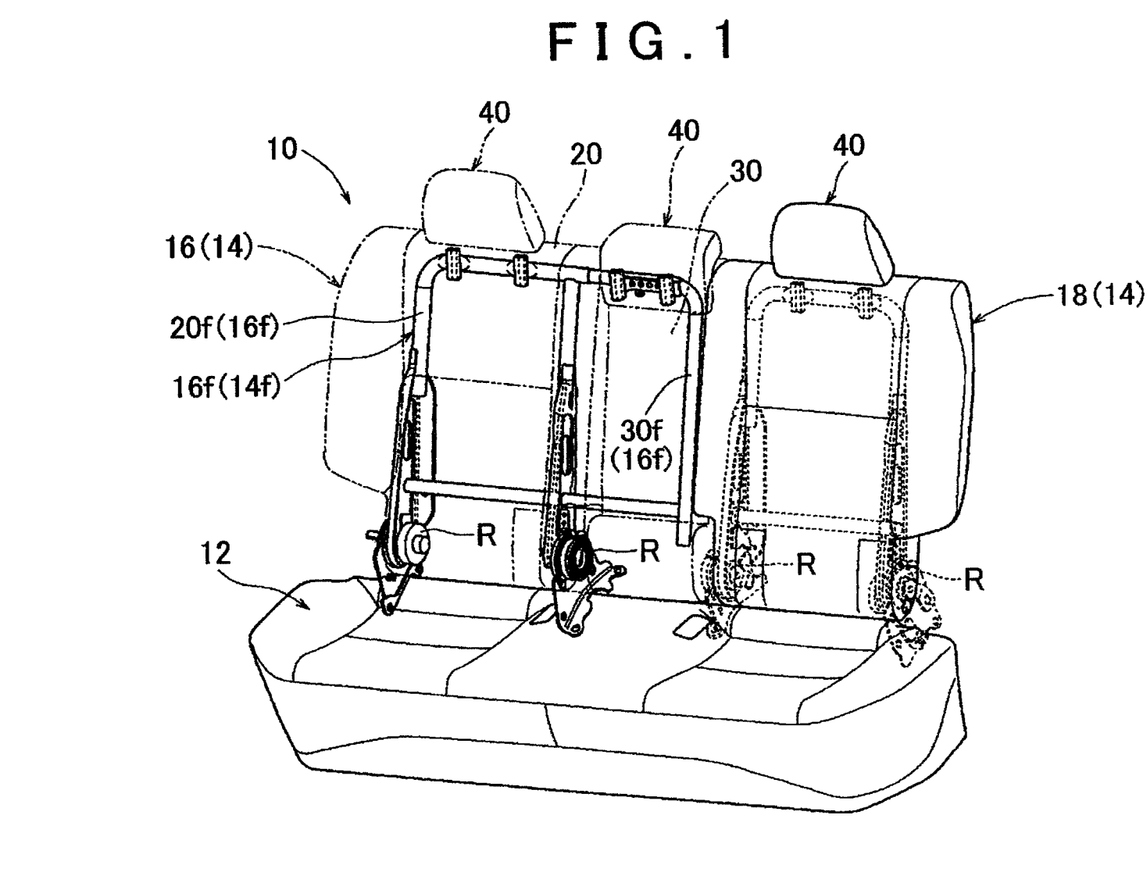
FIG. 1 is a perspective view schematically showing the structure of a vehicle seat to which a seat back frame according to a first example embodiment of the invention has been applied.

First, the structure of a seat back frame according to a first example embodiment will be described with reference to FIGS. 1 to 5. The invention is a seat back frame 14*f*, so portions other than this seat back frame 14*f* do not particularly need to be modified and thus detailed descriptions of those other portions may be omitted. In FIG. 1 is an overall view of a seat, with a narrow seat back 18 on the upper right side in the drawing and a wide seat back 16 on the upper left in the drawing. The headrest and the seat back of the wide seat back 16 are indicated with virtual lines in order to clearly show the structure of a wide seat back frame 16*f*. The structures of pad members and covers are not shown.

As shown in FIG. 1, a vehicle seat 10 to which the seat back frame 14*f* according to the first example embodiment of the invention has been applied is used for any seat arranged in the first to third rows in a vehicle. The seat back frame 14*f* in the first example embodiment represents the structure of a rear seat arranged in the second row in a vehicle. As shown in FIG. 1, the vehicle seat 10 is mainly formed by a seat cushion 12 that serves as a sitting portion for a seated occupant, a seat back 14 that serves as a backrest for the seated occupant, and a headrest 40 that serves as a headrest for the seated occupant. Also, the width of the seat back 14 is divided into a 60/40 split, for example, such that a wide seat back (a two-person seat) 16 that is wide, and a narrow seat back (a one-person seat) 18 that is narrow are formed. The wide seat back 16 and the narrow seat back 18 are each able to be individually tilted forward by reclining mechanisms R arranged at lower ends of the seat backs 16 and 18. Although not shown, the vehicle seat 10 is configured to be compactly stowed by the wide seat back 16 and the narrow seat back 18 being tilted forward, thus opening up space where the vehicle seat 10 had been so that the space can be used as cargo space.

Figure 2:
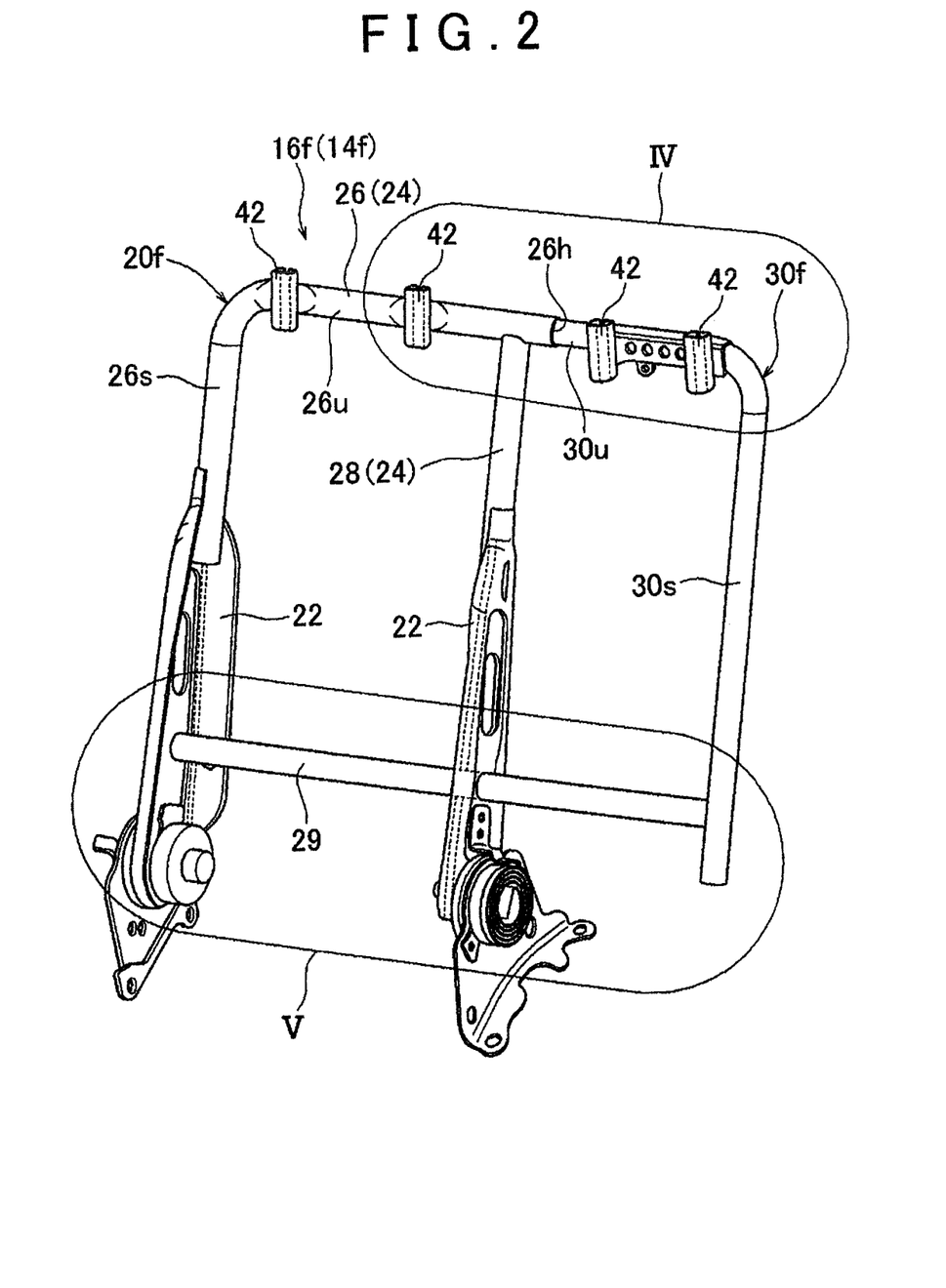
FIG. 2 is an overall perspective view of the seat back frame according to the first example embodiment of the invention.

The wide seat back (two-person seat) 16 is formed wide by a main seat 20 being integrated with an auxiliary seat 30 that is adjacent to the main seat 20 in the width direction. As shown in FIGS. 1 and 2, the wide seat back frame 16*f* built into the wide seat back 16 is formed in an overall wide rectangular frame shape, with a metal sheet member or metal pipe being bent and drawn appropriately. In this wide seat back frame 16*f*, a main frame 20*f* is integrally connected to an auxiliary frame 30*f*. Here, the main frame 20*f* is a frame that forms a frame of a seat back portion of the main seat 20. The auxiliary frame 30*f* is a frame that forms a frame of a seat back portion of the auxiliary seat 30, and is adjacent to the main frame 20*f* of the main seat 20 in the width direction, and connected to the main frame 20*f*.

Figure 3:
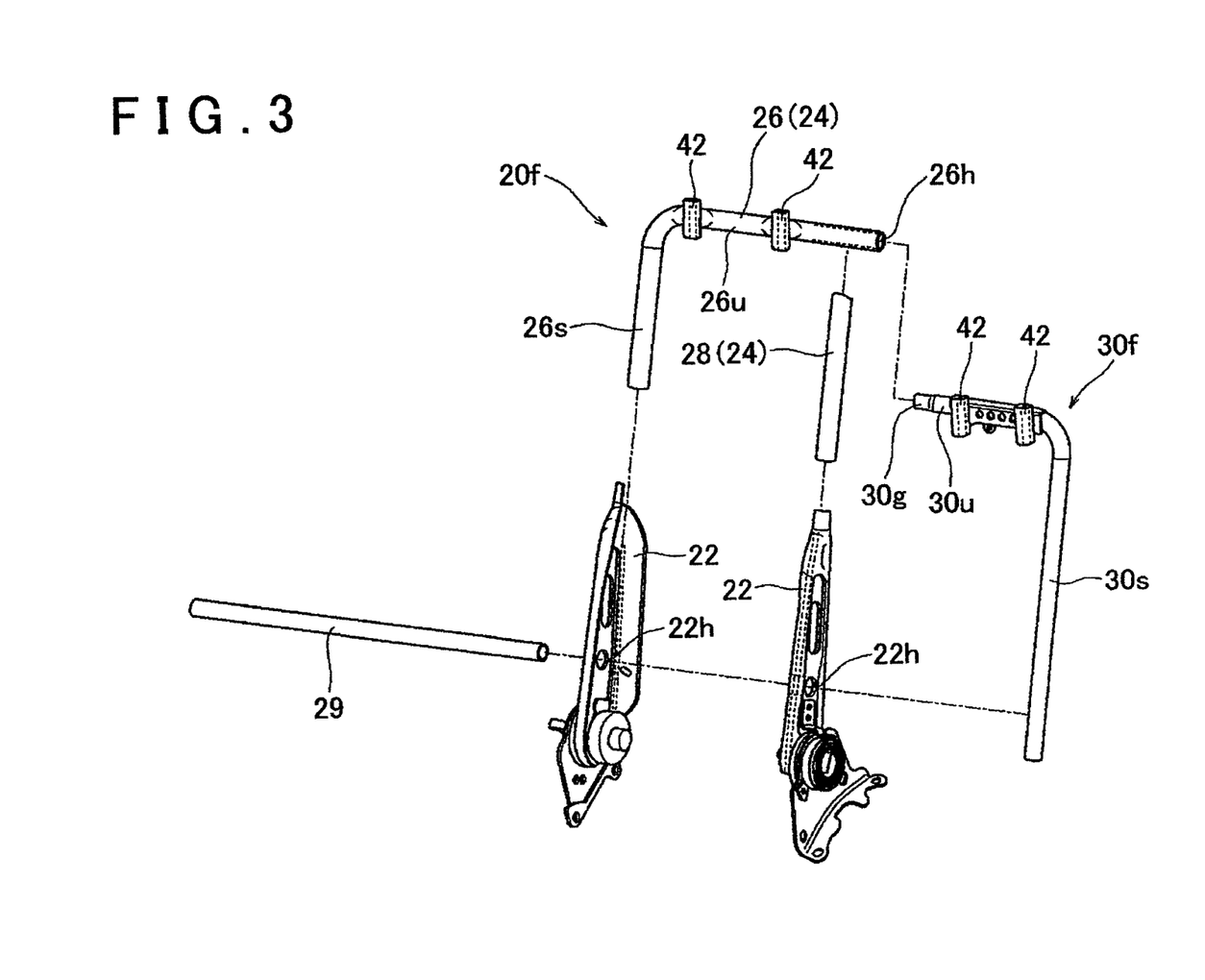
FIG. 3 is an exploded perspective view of the seat back frame according to the first example embodiment of the invention.

As shown in FIGS. 2 and 3, the main frame 20*f* has side frames 22, one formed on each side, an upper frame 24 that connects upper portion of the side frames 22 together, and a reinforcing rod 29 that connects lower portions of the side frames 22 together. The side frames 22 are formed in a matched left and right pair by metal sheet members formed in a batten plate shape that is drawn. The upper sides of the side frames 22 are drawn such that the upper frame 24 can be inserted into them. The upper frame 24 includes a first pipe frame 26 (i.e., a first tube-shaped member) and a second pipe frame 28.

As shown in FIGS. 2 and 3, the first pipe frame 26 is formed by a hollow steel pipe that is bent in a generally inverted L-shape, such that a first upper side portion 26*u* that extends in a seat width direction above the left and right side frames 22, and a first side portion 26*s* that is connected to one of side frames 22 (i.e., the side frame 22 that is arranged on the side opposite the side where the auxiliary seat 30 is in the width direction) are formed. A lower end of the first side portion 26*s* of the first pipe frame 26 is welded in a state inserted into the one side frame 22 (i.e., the side frame 22 that is arranged on the side opposite the side where the auxiliary seat 30 is in the width direction).

Figure 4:
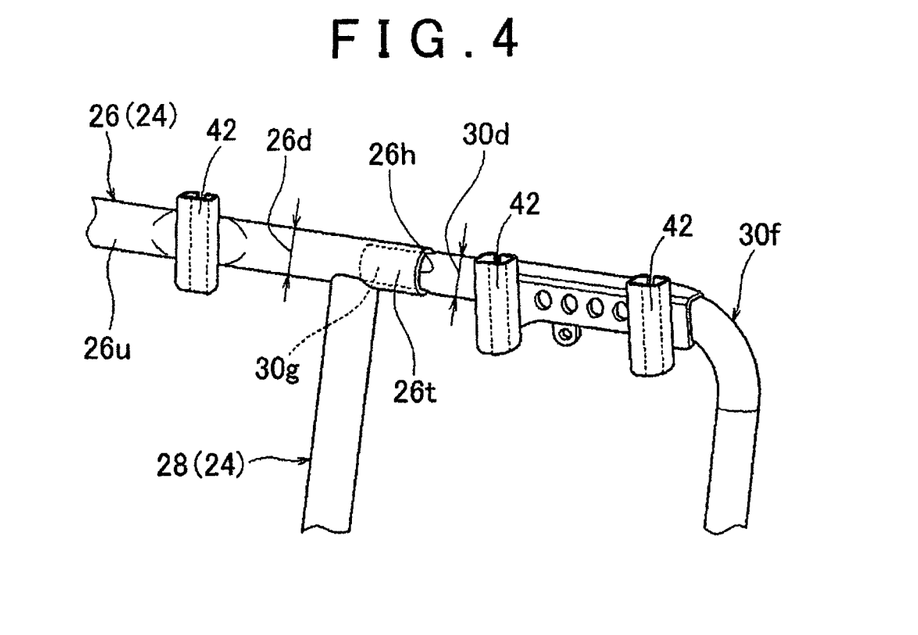
FIG. 4 is a partial enlarged view of portion IV in FIG. 2.

As shown in FIGS. 2, 3, and 4, the first upper side portion 26*u* of the first pipe frame 26 extends above the left and right side frames 22 toward the auxiliary frame 30*f* that will be described later. An end portion of this first upper side portion 26*u* of first pipe frame 26 has a first open portion 26*h* that opens toward the side with the auxiliary seat 30 in the width direction. This first open portion 26*h* of the first pipe frame 26 has a first protruding portion 26*t* that protrudes farther out toward the auxiliary frame 30*f* than a second pipe frame 28. This first protruding portion 26*t* is provided to ensure an area where it (i.e., the first protruding portion 26*t*) is to be welded to the auxiliary frame 30*f*, as well as to make this welding area rigid. Also, a pair of stay holders 42 made of hollow steel pipe is welded to the first upper side portion 26*u* of the first pipe frame 26. These stay holders 42 are for retaining the headrest 40 so that it can be raised and lowered as shown in FIG. 1.

As shown in FIGS. 2 and 3, the second pipe frame 28 is made of hollow steel pipe that is formed in a linear shape. An upper end of the second pipe frame 28 is welded to a lower portion of the first open portion 26h of the first upper side portion 26u of the first pipe frame 26. Also, a lower end of the second pipe frame 28 is welded in a state inserted into one of the side frames 22 (the side frame 22 that is arranged on the side with the auxiliary seat 30 in the width direction).

Figure 5:
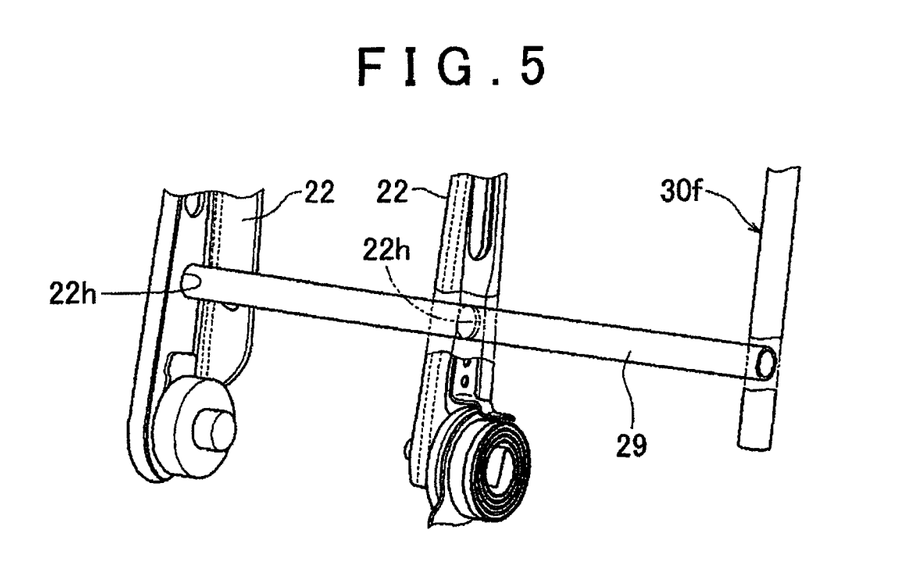
FIG. 5 is a partial enlarged view of portion V in FIG. 2.

As shown in FIGS. 2, 3, and 5, the reinforcing rod 29 connects the lower portions of the side frames 22, and serves to make the lower end portion of the wide seat back 16 (see FIG. 1) rigid. The reinforcing rod 29 is made of hollow steel pipe that is formed in a linear shape. Through-holes 22h that are connected by the reinforcing rod 29 are formed in the side frames 22. The reinforcing rod 29 is inserted through the through-holes 22h in the left and right side frames 22 and welded in place. Also, the reinforcing rod 29 is formed of a length that enables it to pass through the side frame 22 that is arranged on the side with the auxiliary frame 30f, from among the two side frames 22, and extend to a position abutting against the auxiliary frame 30f. Then the abutting portion of the auxiliary frame 30f and the reinforcing rod 29 is welded.

As shown in FIGS. 2 and 3, the auxiliary frame 30f (i.e., a second tube-shaped member) is made of hollow steel pipe that is bent in a generally inverted L-shape. The auxiliary frame 30f is formed by a second upper side portion 30u that is fitted to the first open portion 26h of the first pipe frame 26, and a second side portion 30s that extends from the second upper side portion 30u to the reinforcing rod 29. Also, a pair of stay holders 42 made of hollow steel pipe similar to those on the first upper side portion 26u of the first pipe frame 26 is welded to the second upper side portion 30u.

As shown in FIG. 4, a diameter 26d of the first pipe frame 26 of the main frame 20f is set to be larger than a diameter 30d of the auxiliary frame 30f. This is because when considering the frequency with which an occupant sits in the main seat 20 and the frequency with which an occupant sits in the auxiliary seat 30, the frequency with which an occupant sits in the main seat 20 is higher. Therefore, with the vehicle seat 10, the rigidity of the main seat 20 side is set to be higher than the rigidity of the auxiliary seat 30.

As shown in FIGS. 3 and 4, an end portion 30g of the second upper side portion 30u of the auxiliary frame 30f is formed in a stepped shape by swaging (drawing), and is formed so as to be able to fit into the first open portion 26h of the first pipe frame 26 of the main frame 20f. Also, the end portion 30g of the second upper side portion 30u of the auxiliary frame 30f is welded after being fit into the first open portion 26h of the first pipe frame 26. Also, as shown in FIG. 5, the abutting portion of the reinforcing rod 29 and the second side portion 30s of the auxiliary frame 30f is welded. In this way, the main frame 20f is integrally formed with the auxiliary frame 30f.

In this way, with the seat back frame 14f according to the first example embodiment, the first pipe frame 26 (i.e., the first tube-shaped member) of the main frame 20f has the first open portion 26h that opens toward the auxiliary seat 30 side in the width direction. Also, the end portion 30g of the auxiliary frame 30f is a fitting structure that is fits together with the first open portion 26h of the first pipe frame 26 and is welded there, such that the main frame 20f is integrally formed with the auxiliary frame 30f. Therefore, press-forming to make the end portion 30g of the auxiliary frame 30f into a flat end portion is not necessary as it is in the related art, so the manufacturing cost is able to be suppressed. Also, the structure in which the end portion of the auxiliary frame is made into the flat end portion of the related art is a structure in which stress with respect to a load on the seat back concentrates. The structure described above is not a structure of a flat end portion, but rather a structure of a tube-shaped member of a hollow steel tube, so it is a structure in which stress does not tend to concentrate. Also, there is no need to provide a reinforcing plate, so the number of parts can be inhibited from increasing. Accordingly, it is possible to provide the seat back frame 14f in which the main frame 20f that forms the frame of the seat back portion of the main seat 20 is integrally formed with the auxiliary frame 30f that forms the frame of the seat back portion of the auxiliary seat 30 adjacent to the main seat 20 in the width direction, without leading to an increase in the number of parts.

Also, the reinforcing rod 29 that extends between the side frames 22 is provided at the lower portion of the side frames 22. This reinforcing rod 29 passes through the side frame 22 that is arranged on the side with the auxiliary frame 30f, from among the two side frames 22, and extends to a position where it abuts against the auxiliary frame 30f, and the abutting portion of the reinforcing rod 29 and the auxiliary frame 30f is welded. Therefore, the main frame 20f and the auxiliary frame 30f both share the reinforcing rod 29, so an increase in the number of parts is able to be further inhibited. Also, a moment load following rotation of the seat back 14 is applied to the lower portion of the seat back 14, so stress tends to concentrate there (i.e., at the lower portion of the seat back 14). In particular, with the related structure in which both the main frame 20f and the auxiliary frame 30f have a related reinforcing rod, these related reinforcing rods are both welded, so stress of the moment load tends to concentrate at this weld. Here, by having the reinforcing rod 29 be shared and pass through the side frame 22 that is arranged on the side with the auxiliary frame 30f as in the structure described above, the portion that is welded can be reduced, thus suppressing stress concentration of the moment load. Also, a thick member may easily be applied to the reinforcing rod 29 while minimizing the number of parts. Applying a thick member to the reinforcing rod 29 in this way enables the rigidity of both the main frame 20f and the auxiliary frame 30f to be increased. As a result, the rigidity of the entire seat back 14 is able to be increased. Also, the side frame 22 can be shared by both the wide seat back 16 and the narrow seat back 18. Further, during manufacture of the wide seat back 16 and the narrow seat back 18, assembly jigs can also be shared, so the cost may be able to be reduced even further.

Moreover, the lower portion of the seat back 14 is a portion where a moment load following rotation of the seat back 14 is applied and thus is a portion where stress tends to concentrate. Therefore, by having the portion where the weld of the end portion 30g of the auxiliary frame 30f (i.e., the second tube-shaped member) and the first open portion 26h of the first pipe frame 26 (i.e., the first tube-shaped member) is provided be the upper frame 24 that is positioned at the upper portion of the seat back 14, the number of parts is able to be minimized while inhibiting stress concentration.

Figure 6:
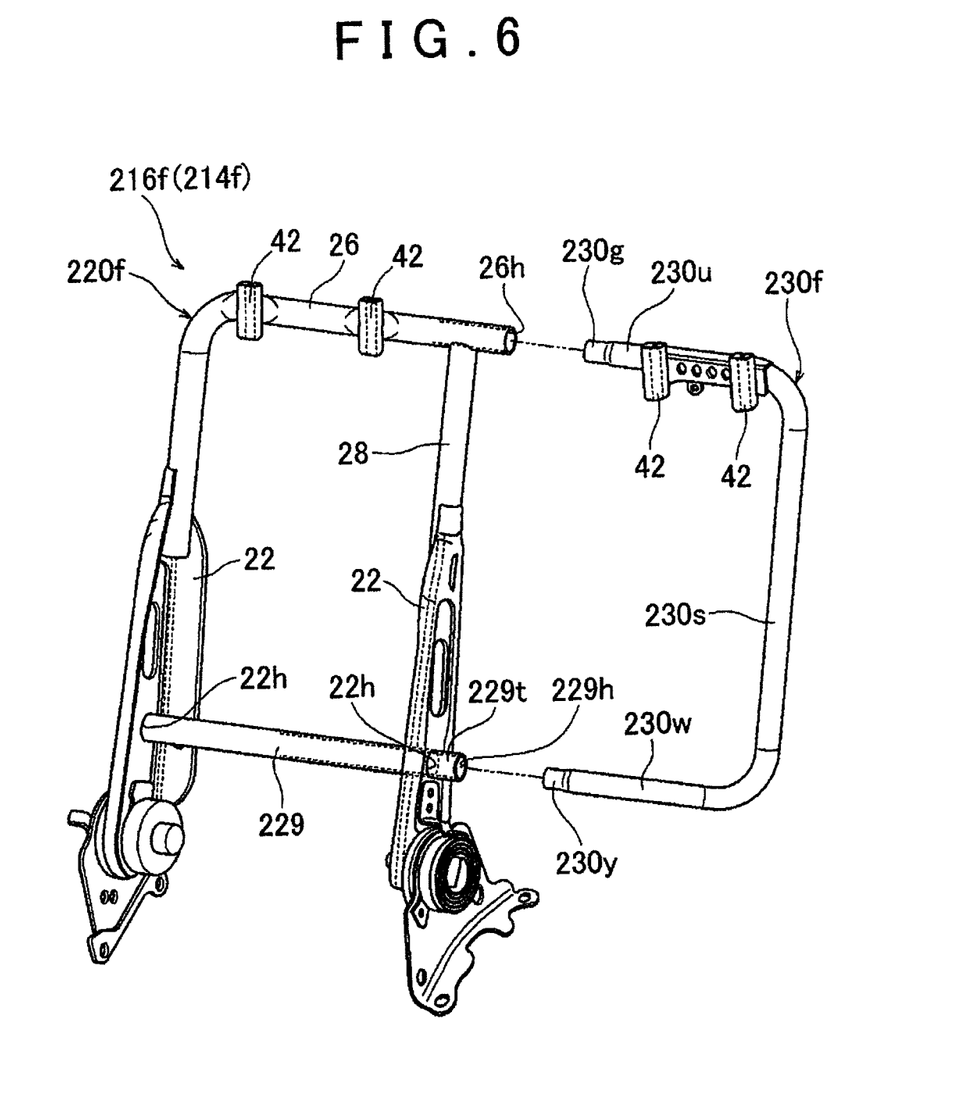
FIG. 6 is an overall perspective view of a seat back frame according to a second example embodiment of the invention.

Next, a seat back frame 214f according to a second example embodiment of the invention will be described with reference to FIG. 6. That is, the auxiliary frame structure differs from that of the seat back frame 14f of the first example embodiment. As shown in FIG. 6, an auxiliary frame 230f of a wide seat back frame 216f according to the second example embodiment is made of hollow steel pipe that has been bent into a generally inverted U-shape. More specifically, the auxiliary frame 230f forms a lower side portion 230w that extends from a lower end portion of a second side portion 230s toward a side frame 22 of a main frame 220f. A reinforcing rod 229 is formed of a length such that it just extends between the side frames 22 of the main frame 220f. Also, the reinforcing rod 229 has a second open portion 229h that opens toward the side with the auxiliary seat 30 in the width direction. Further, the reinforcing rod 229 has a second protruding portion 229t that protrudes out from a through-hole 22h of the side frame 22 toward the auxiliary frame 230f. An end portion 230g of the second upper side portion 230u of the auxiliary frame 230f is formed in a stepped shape by swaging (drawing), similar to the end portion 30g of the second upper side portion 30u of the auxiliary frame 30f in the first example embodiment. Also, an end portion 230y of a lower side portion 230w of the auxiliary frame 230f is formed in a stepped shape by swaging (drawing), similar to the end portion 230g of the second upper side portion 230u, and is formed so as to be able to fit into the second open portion 229h formed in the reinforcing rod 229. Also, the end portion 230g of the second upper side portion 230u of the auxiliary frame 230f is welded in place after being fit into the first open portion 26h of the first pipe frame 26. Also, the end portion 230y of the lower side portion 230w of the auxiliary frame 230f is welded in place after being fit into the second open portion 229h of the reinforcing rod 229. The rest of the structure is the same as that in the first example embodiment. Accordingly, the seat back frame according to the second example embodiment performs the same function as the seat back frame according to the first example embodiment, and the same operation and effects are able to be obtained. Further, the reinforcing rod 229 is able to be common for the wide seat back 216 and the narrow seat back 18.

Heretofore, the invention has been described using the first and second example embodiments, but the invention may also be carried out in various modes other than the first and second example embodiments described above. For example, in the first and second example embodiments, the end portion 30g of the second upper side portion 30u of the auxiliary frame 30f, the end portion 230g of the second upper side portion 230u of the auxiliary frame 230f, and the end portion 230y of the lower side portion 230w are all described as structures formed in a stepped shape by swaging, but they are not limited to being formed in stepped shapes. That is, as long as they are able to fit into the first open portion 26h and the second open portion 229h, they may also be formed in tapered shapes, or they may be formed without stepped shapes or tapered shapes.

Moreover, the diameter 26d of the first pipe frame 26 is described as being larger than the diameter of the auxiliary frame 30f and 230f, but the diameter 26d of the first pipe frame 26 may also be the same as the diameter of the auxiliary frame 30f and 230f as long as the end portion 30g, 230g, and 230y of the auxiliary frame 30f and 230f are able to fit into the main frame 20f and 220f.

Also, the fitting structure of the main frame 20f and the auxiliary frame 30f may be reversed. This may also apply to the fitting structure of the main frame 220f and the auxiliary frame 230f.

What is claimed is:

1. A seat back frame comprising:
   a main frame that defines a frame of a seat back of a main seat, the main frame having a side frame provided on both sides of the main frame in the width direction, and an upper frame that connects upper portions of the side frames together, and
   an auxiliary frame that defines a frame of a seat back of an auxiliary seat adjacent to the main seat in a width direction, and that is integrally connected with the main frame, wherein
   at least a portion of the main frame includes a first tube-shaped member, the first tube-shaped member having a first open portion that opens toward a side with the auxiliary seat in the width direction,
   at least a portion of the auxiliary frame includes a second tube-shaped member, and an end portion of the second tube-shaped member is a fitting structure that fits within the first open portion of the first tube-shaped member, and
   a portion of the fitting structure is welded such that the main frame and the auxiliary frame are integrally connected along the upper frame of the main frame.

2. The seat back frame according to claim 1, wherein
   a reinforcing rod that connects the side frames together is provided at a lower portion of the side frames,
   the reinforcing rod passes through the side frame that is arranged on a side with the auxiliary frame and extends to a position abutting against the auxiliary frame, and
   an abutting portion of the reinforcing rod and the auxiliary frame are welded together.

3. The seat back frame according to claim 1, wherein a diameter of the first open portion of the first tube-shaped member is larger than a diameter of the second tube-shaped member.

* * * * *